US00RE45825E

(19) United States
(12) Reissued Patent
Magno, Jr. et al.

(10) Patent Number: US RE45,825 E
(45) Date of Reissued Patent: Dec. 22, 2015

(54) FAST BEAM CLAMP

(71) Applicants: Joey D. Magno, Jr., Cordova, TN (US); Xueming Cai, Collierville, TN (US)

(72) Inventors: Joey D. Magno, Jr., Cordova, TN (US); Xueming Cai, Collierville, TN (US)

(73) Assignee: Thomas & Betts International LLC, Wilmington, DE (US)

(21) Appl. No.: 13/661,831

(22) Filed: Oct. 26, 2012

Related U.S. Patent Documents

Reissue of:
(64) Patent No.: 8,038,106
Issued: Oct. 18, 2011
Appl. No.: 12/277,363
Filed: Nov. 25, 2008

(51) Int. Cl.

| | |
|---|---|
| ***F16L 3/24*** | (2006.01) |
| ***H02G 3/32*** | (2006.01) |
| ***F16B 2/10*** | (2006.01) |
| ***F16B 2/06*** | (2006.01) |

(52) U.S. Cl.
CPC *H02G 3/32* (2013.01); *F16B 2/065* (2013.01); *F16B 2/10* (2013.01); *F16L 3/24* (2013.01)

(58) Field of Classification Search
CPC ..... F16L 3/24; F16B 2/065; F16B 2/10; H02G 3/32; A01B 12/006
USPC ..... 248/65, 72, 73, 228.1, 74.5, 74.1, 317, 248/327, 228.4, 230.4, 231.51, 229.23, 248/229.13; 269/166, 249, 143, 257, 276; 294/101, 104; 52/127.9
See application file for complete search history.

(56) References Cited

U.S. PATENT DOCUMENTS

| | | | | | |
|---|---|---|---|---|---|
| 339,072 | A | * | 3/1886 | Nies | 269/249 |
| 497,679 | A | * | 5/1893 | Newbury | 248/72 |
| 769,746 | A | * | 9/1904 | Hewlett | 248/72 |
| 804,342 | A | * | 11/1905 | Randall | 269/217 |
| 819,259 | A | | 5/1906 | White | |
| 1,137,693 | A | * | 4/1915 | Baxter | 269/246 |
| 1,241,459 | A | * | 9/1917 | Woodard | 188/45 |
| 1,568,122 | A | | 1/1926 | Zifferer | |
| 1,613,394 | A | * | 1/1927 | Harris | 248/59 |
| 1,820,229 | A | * | 9/1931 | Korns | 248/72 |
| 2,068,902 | A | * | 1/1937 | Blunt | 248/74.1 |
| 2,164,455 | A | * | 7/1939 | Hart | 409/222 |
| 2,282,310 | A | * | 5/1942 | Dunn | 269/98 |
| 2,360,602 | A | * | 10/1944 | Waldrup | 294/104 |
| 2,422,865 | A | | 6/1947 | Tucker | |
| 2,446,610 | A | | 8/1948 | Renfroe | |
| 2,472,022 | A | * | 5/1949 | Neal | 269/157 |
| 2,553,802 | A | * | 5/1951 | Woods | 269/142 |
| 2,654,630 | A | | 10/1953 | Renfroe | |
| 2,852,300 | A | * | 9/1958 | Gardner | 294/104 |
| 3,039,161 | A | * | 6/1962 | Gagnon | 24/490 |
| 3,084,893 | A | | 4/1963 | Ruth | |
| 3,124,330 | A | | 3/1964 | Robinson | |

(Continued)

FOREIGN PATENT DOCUMENTS

| | | |
|---|---|---|
| CA | 2012873 | 5/2000 |
| CA | 2308917 A1 | 11/2001 |

(Continued)

*Primary Examiner* — Nkeisha Smith
(74) *Attorney, Agent, or Firm* — Hoffmann & Baron, LLP

(57) ABSTRACT

A beam clamp includes a clamp base and a rotational portion. The base includes an interior cavity and an external surface. The base and the rotational portion are pivotably connected by a mateable device. The rotational portion extends into the interior cavity of the base and the rotational portion includes a torsion spring.

15 Claims, 11 Drawing Sheets

(56) References Cited

U.S. PATENT DOCUMENTS

| | | | | | |
|---|---|---|---|---|---|
| 3,171,178 | A | | 3/1965 | Smith et al. | |
| 3,262,731 | A | | 7/1966 | Renfroe | |
| 3,288,409 | A | * | 11/1966 | Bethea, Jr. | 248/62 |
| 3,336,068 | A | | 8/1967 | Renfroe | 294/101 |
| 3,575,405 | A | * | 4/1971 | Harding | 269/258 |
| 3,659,890 | A | | 5/1972 | Renfroe | |
| 3,773,377 | A | | 11/1973 | Kopp | 294/104 |
| 3,857,600 | A | | 12/1974 | Hasegawa | |
| 4,113,298 | A | | 9/1978 | Kopp | |
| 4,162,804 | A | | 7/1979 | Davies | |
| 4,176,830 | A | * | 12/1979 | Isley | 269/6 |
| 4,541,155 | A | * | 9/1985 | Gagnon | 24/486 |
| 4,641,877 | A | * | 2/1987 | Merrill | 294/101 |
| 4,702,508 | A | | 10/1987 | Weiner et al. | |
| 4,793,578 | A | * | 12/1988 | Howard | 248/62 |
| 4,795,115 | A | * | 1/1989 | Breeden et al. | 248/59 |
| 4,846,431 | A | | 7/1989 | Pflieger | |
| 4,852,840 | A | * | 8/1989 | Marks | 248/230.4 |
| 4,884,836 | A | | 12/1989 | Maye et al. | 294/101 |
| 4,901,963 | A | * | 2/1990 | Yoder | 24/489 |
| 4,953,820 | A | * | 9/1990 | Yoder | 24/489 |
| 5,014,950 | A | | 5/1991 | Ohman et al. | |
| 5,131,780 | A | | 7/1992 | Love | 403/290 |
| 5,462,264 | A | * | 10/1995 | Delagera | 269/249 |
| D364,792 | S | | 12/1995 | Yoder et al. | |
| 5,529,297 | A | * | 6/1996 | Sawdon | 269/239 |
| 5,556,299 | A | * | 9/1996 | Finke | 439/479 |
| 5,701,991 | A | | 12/1997 | Helmetsie | |
| 5,752,680 | A | * | 5/1998 | Mann | 248/63 |
| 5,765,902 | A | * | 6/1998 | Love | 296/100.01 |
| 5,860,691 | A | * | 1/1999 | Thomsen et al. | 296/100.18 |
| 6,086,126 | A | | 7/2000 | Krauss | 294/104 |
| 6,708,966 | B1 | * | 3/2004 | Troudt | 269/249 |
| 6,893,012 | B2 | * | 5/2005 | Wong | 269/249 |
| 6,942,266 | B1 | | 9/2005 | Van Sickle | |
| 7,011,284 | B2 | | 3/2006 | Melius | |
| 7,819,448 | B2 | | 10/2010 | Bates | |
| 2004/0232608 | A1 | * | 11/2004 | Wong | 269/249 |
| 2006/0061112 | A1 | * | 3/2006 | Schon | 294/101 |
| 2008/0048375 | A1 | * | 2/2008 | Rolfe et al. | 269/249 |

FOREIGN PATENT DOCUMENTS

| | | | |
|---|---|---|---|
| CA | 2085397 | | 3/2002 |
| CA | 2365761 | A1 | 8/2002 |
| CA | 2370420 | A1 | 4/2003 |
| CA | 106089 | | 5/2005 |
| CA | 2205215 | | 7/2005 |
| CA | 2628647 | A1 | 10/2008 |
| CA | 2675812 | A1 | 2/2010 |
| WO | WO 2006/118456 | A1 | 11/2006 |
| WO | WO 2008/069665 | | 6/2008 |

* cited by examiner

FAST BEAM CLAMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority to U.S. Provisional Patent Application No. 61/004,739 filed on Nov. 29, 2007, all of

FIELD OF THE INVENTION

The present invention relates generally to an adjustable clamp. More particularly, the present invention relates to a clamp for securement to a beam to support various attachments therefrom.

BACKGROUND OF THE INVENTION

Beam clamps are temporarily and/or permanently mount to a wide range of tapered or flat beams. For example, beam clamps are attached to the flange of the support beam and include a threaded member to allow for a way to secure various attachments to the support beam. For example, in an industrial setting, a conduit channel, lighting, equipment or piping can be attached to a support beam using a variety of clamping devices.

Some prior art clamps are limited in their design, for example, some clamping devices are designed to attach to a specific surface and size beam. Additionally, some clamping devices are designed to only allow for attachment of a member which runs parallel to the beam, while other clamping devices are designed for attachment of items running only perpendicular to the beam. Additionally, some prior art clamping devices include various parts to assemble. For example, a set screw is often used to lock the clamping device into place and a rod is attached to the clamping device to provide a site for attachment of various members. The additional step of placing the clamping device in place, holding it in place while one tightens the set screw to allow for securement of the clamping device to the beam is difficult and time consuming because of the numerous steps and parts. Further, the rod must then be attached to provide for a site of attachment for other structures.

It is therefore desirable to provide a clamping device, which can be mounted on a support beam of various sizes without the complexity, or cost of prior art designs, has a more compact design and less additional parts, provides greater securement to the beam and provides for easy installation and removal of the clamp without extra effort or steps on the part of the user.

SUMMARY OF THE INVENTION

The present invention provides a clamp, which can be attached to a flat or tapered surface such as a flange of a beam which may be of various sizes. In accordance with the present invention, the foregoing disadvantages of the prior art are addressed. In accordance with one aspect of the invention, a beam clamp includes a body and a threaded rod. The body includes a base, a rotational portion, a mateable device, and a threaded receiver. The base includes an interior cavity and an external surface. The base and the rotational portion are pivotably connected by the mateable device. The rotational portion extends into the interior cavity and the rotational portion includes a torsion spring. The threaded receiver extends from the base and is matable with the threaded rod.

Further, the base includes teeth extending toward the rotational portion. The rotational portion includes teeth extending toward the base. The mateable device includes a pair of pins and a pair of slots. The pins extend from the rotational portion and the pair of slots is integral with the base. The pair of pins is received by the pair of slots and pivotable therein. The pair of slots are opposed the teeth of the base. The rotational portion includes a rounded wedge portion and a triangular portion integrally extending from the wedge portion. The teeth extend from the rounded portion of the wedge. The triangular portion contacts the spring, and the spring forces the rotational portion out from the interior cavity of the base.

Furthermore, the present invention provides for a beam clamp including a base, a rotational portion and a mateable device pivotably connecting the base to the rotational portion. The base has a C-shaped geometry, and the C-shaped geometry defines an interior cavity. The base includes a row of teeth extending into the interior cavity. The rotational portion extends into the interior cavity and the rotational portion includes a series of protruding teeth at one end.

Additionally, the present invention provides for a beam clamp including a clamp base, a rotational portion and a mateable device pivotably attaching the clamp base to the rotational portion. The clamp base includes two parallel C-shaped planar plates attached together by a recessed portion and a threaded receiver portion. Each plate includes a row of teeth and an opening through one end of each plate. The recessed portion includes a hole therethrough for a bolt to extend therethough. The threaded receiver portion includes a threaded hole to accept a threaded rod therein. The rotational portion includes a hole therethrough for accepting a mateable device therein. The mateable device extends through the openings through the plate ends and the hole through the rotational end.

DETAILED DESCRIPTION OF THE PREFERRED EMBODIMENT

Referring to FIGS. 1-6, there is shown a perspective view of the clamping device according to the present invention.

Figure 1:
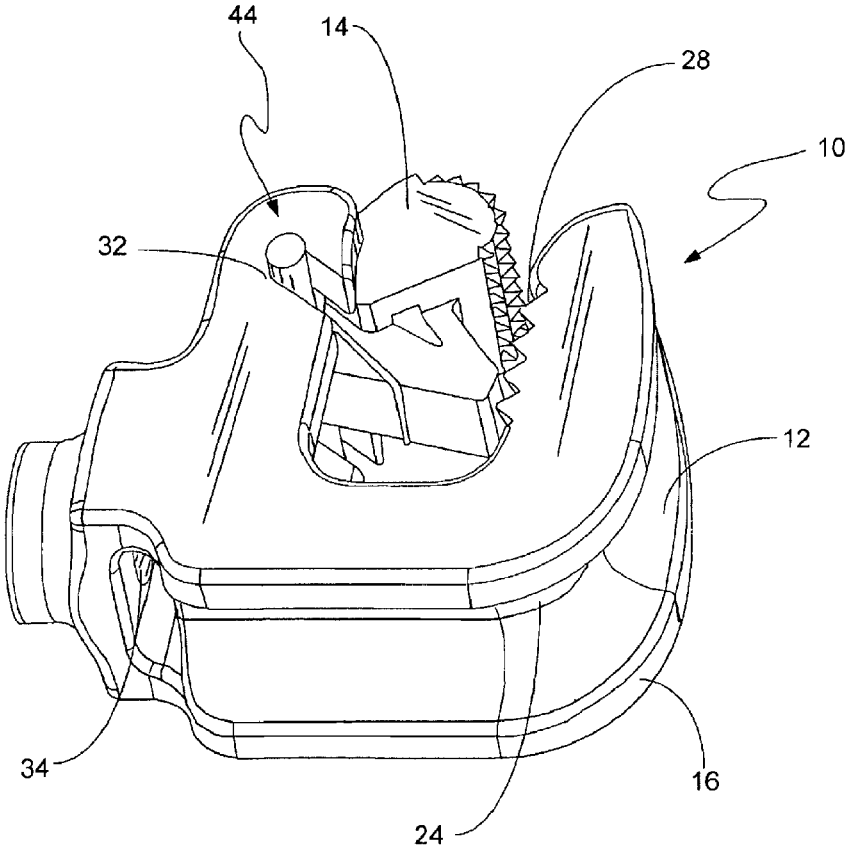
FIG. 1 is a perspective view of a clamp according to the present invention.
Figure 2:
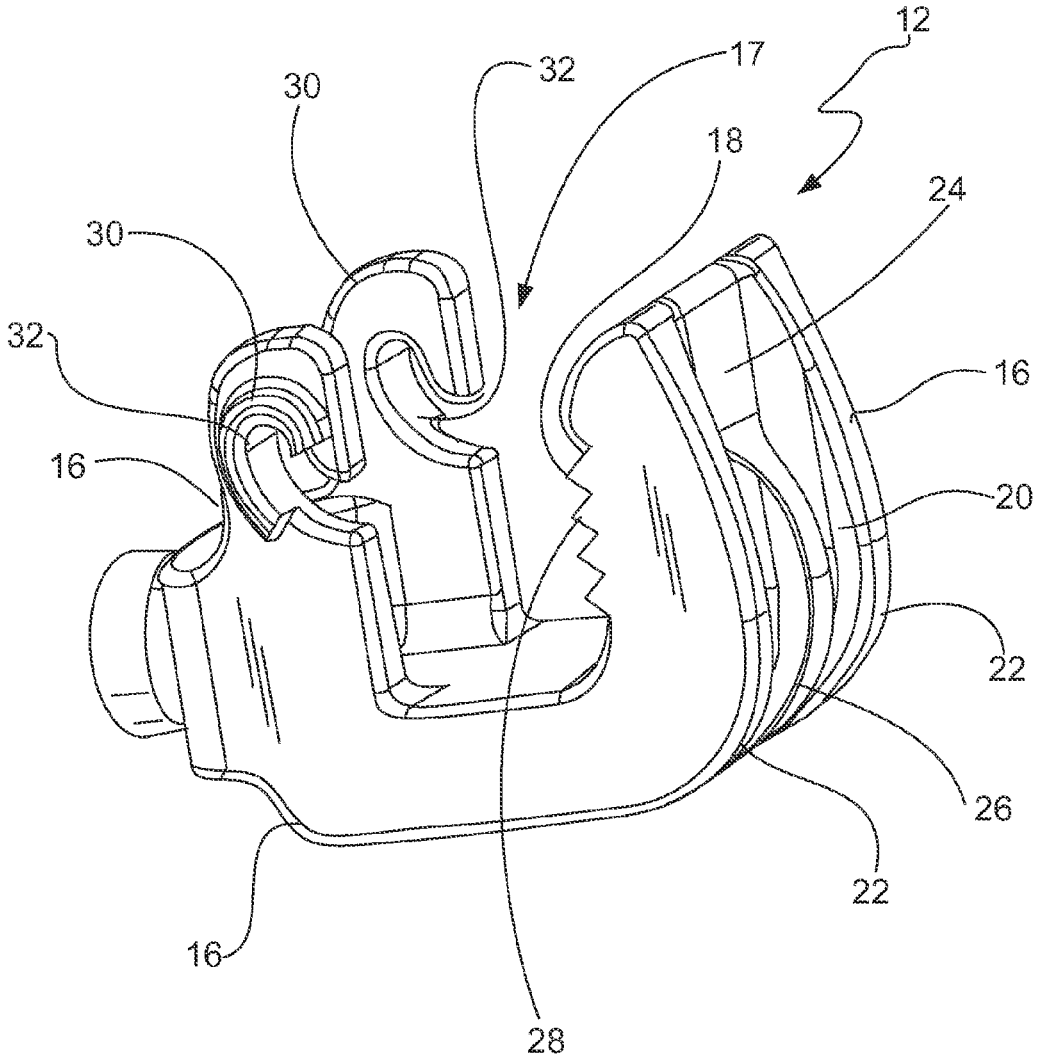
FIG. 2 is a perspective view of a portion of a clamp according to the present invention.
Figure 5:
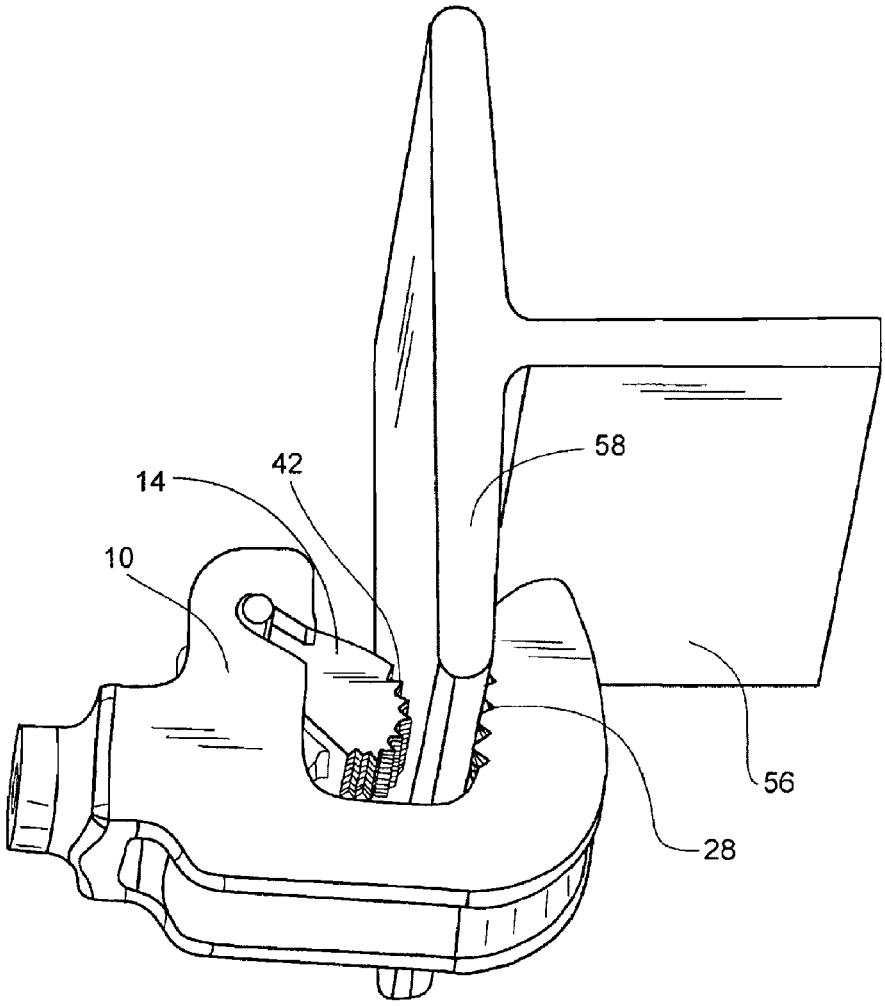
FIG. 5 is a perspective view of the clamp of FIG. 1 attached to a flange of a support beam.

FIG. 1 shows clamp body 10 having a clamp base 12 and a rotational portion 14. The clamp base 12 has a U or C shaped geometry with an interior cavity 17 for accepting a planar surface, such as a flange 58 of a support beam 56. FIG. 2 shows the clamp body 10 including an exterior surface 16 and an interior surface 18. The clamp base 12 may be a solid structure or an exoskeleton structure. The clamp base 12 is ideally an integrally formed rigid member, preferably formed from a metallic material. FIG. 2 shows an exoskeleton structure 20 which includes two parallel outer plates 22 connected together by a recessed bridge 24, and an optional inner supporting ridge 26 protruding from the bridge 24. The supporting ridge 26 between the plates 22 is preferably parallel to the plates 22. The exoskeleton design of FIG. 2 provides for a lighter weight clamping device while plates 22 and the ridge 26 provide additional structural support. Other designs of base 12 are also possible whether base 12 is a unitary member or an assembly of individual components. The interior surface 18 includes a row of teeth 28 which contact and grip the top of beam flange 58, as shown in FIG. 5. Opposite the teeth 28 are inwardly curling brackets 30. The brackets 30 include sloped slots 32 for accepting the rotational portion 14 therein. One end of the clamp base 12 includes a threaded receiver 34 for receiving a threaded rod therein. The threaded receiver 34 is positioned at the opposite end of the clamp base 12 from the teeth 28. The threaded receiver 34 is a hole which extends from the exterior surface 16 through to the interior surface 18. Threads are disposed along at least a portion of the inner diameter of the threaded receiver 34. The clamp base 12 is preferably one molded structure to provide for strength and rigidity.

Figure 3:
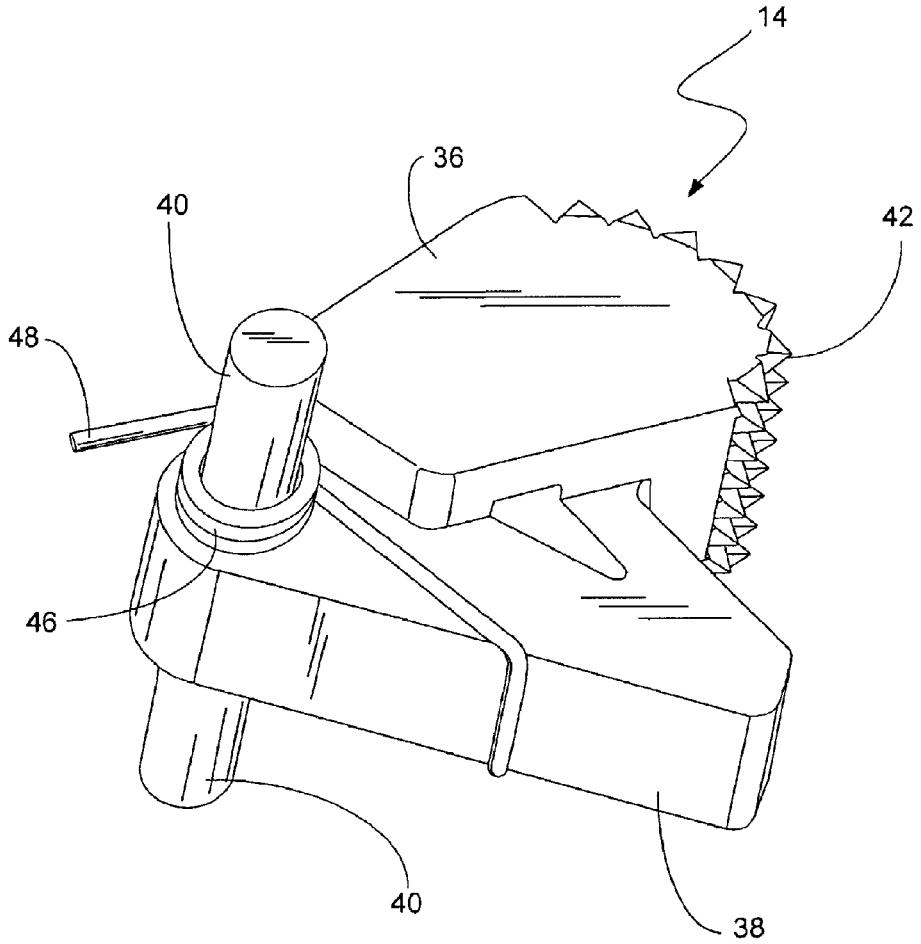
FIG. 3 is a perspective view of a portion of a clamp according to the present invention.
Figure 6:
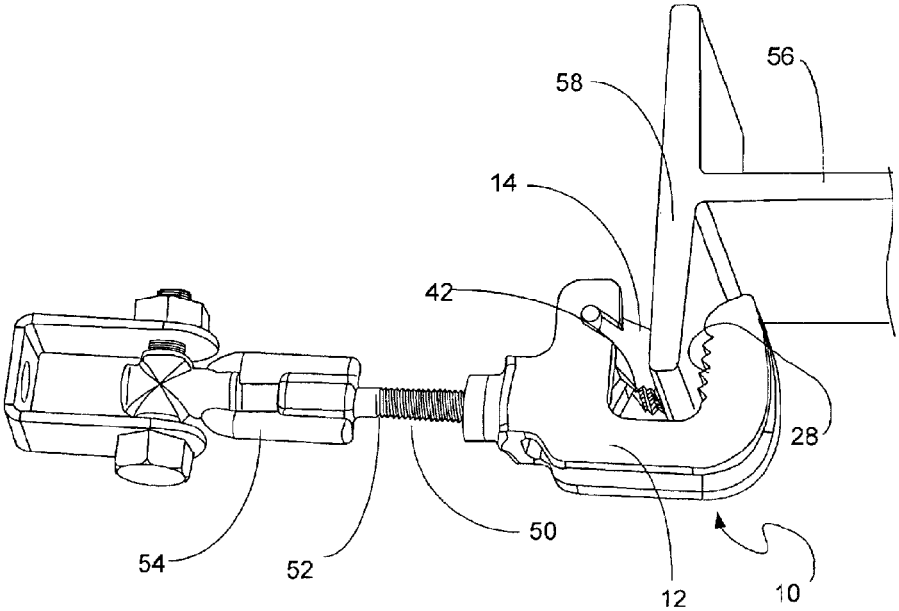
FIG. 6 is a perspective view of the clamp of FIG. 4 attached to a flange of a support beam and an attachment at one end.

The rotational portion 14 is removably attached to the clamp base 12. FIG. 3 shows the rotational portion 14 which includes a rounded wedge portion 36, a protruding triangular portion 38 and two pins 40 protruding therefrom. The wedge portion 36 includes a series of rows of teeth 42 for gripping and securing to the beam flange 58, as shown in FIGS. 5 and 6. The teeth 42 cover the rounded surface of the wedge 36 to allow for some of teeth 42 to remain perpendicular or nearly perpendicular with respect to the contacted surface of the flange 58 for better securement thereto. The triangular portion 38 extends from the side of the wedge 36. The pins 40 in this embodiment protrude from opposite sides of the triangular portion 38. The pins 40 extend along the same linear axis in opposite directions. All these parts of the rotational portion 14 are connected by material continuity and preferably molded as a single piece.

The pins 40 are designed to mate with the slots 32 of the clamp base 12 defining the mateable device 44. The pins 40 allow for the rotational portion 14 to pivot about a pivot point within the slots 32. When the pins 40 are placed into slots 32 then the rotational portion 14 can seat in the interior cavity 17 of the base 12, and it can pivot about the slots preferably at least 180 degrees but less then 360 degrees. The pivoting rotational portion 14 allows the teeth 42 to generally perpendicularly come into contact with the bottom portion of the flange 58 which, along with teeth 28 engaging the top portion of flange 58, provides for securement of the clamp body 10 to the beam 56.

The rotational portion 14 further includes a torsion spring 46. Torsion spring 46 mounts to pin 40 and includes an extension arm 48 that extends outward from the pin. In a different direction, torsion spring 46 includes a portion that engages the triangular portion 38. When the rotational portion 14 is attached to the base 12, via the slot 32 and pins 40, the extension arm 48 comes into contact with the interior surface 18 of the base 12. This causes the rotational portion 14 to be biased with respect to the interior cavity 17 and prevents the rotational portion 14 from seating completely within the base 12 without counteracting the force of the torsion spring 46. Further, when the beam flange 58 is introduced to the interior of the base 12, the torsion spring 46 provides resistance against the flange 58 of the beam 56 as it forces the rotational portion 14 to push upwardly against the beam flange 58 and out from the interior cavity 17 of the base 12. The resistance between the flange 58 and the clamp body 10 provides for temporary securement of the clamp body 10 to the beam 56, without the need for additional screws to adjust the clamp body to fit the beam and secure it thereto.

Figure 4:
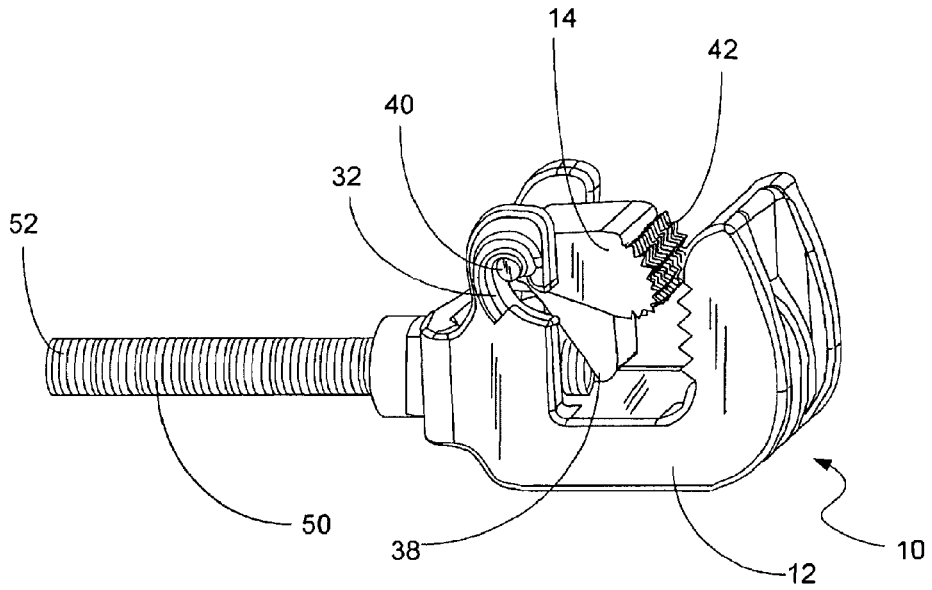
FIG. 4 is a perspective view of a clamp including the threaded rod according to the present invention.

Threaded rod 50 protrudes from the bottom of clamp body 10 and can be screwed into clamp body 10 contacting the triangular portion 38. FIG. 4 shows threaded rod 50 screwed into threaded receiver 34. Thread receiver 34 is internally threaded to accommodate the extending, externally threaded rod 50. As the threaded rod 50 is tightened upwardly, it pushes against the triangular portion 38 which allows for the teeth 42 of the triangular portion to press against the beam 56 permanently securing the clamp body 10 to the beam flange 58. The free end 52 of the rod is available for attachment of various devices 54. Thus, the threaded rod 50 serves two purposes, i.e. to permanently secure the clamp body 10 to the beam 56 and to allow for attachment of various devices.

Figure 7:
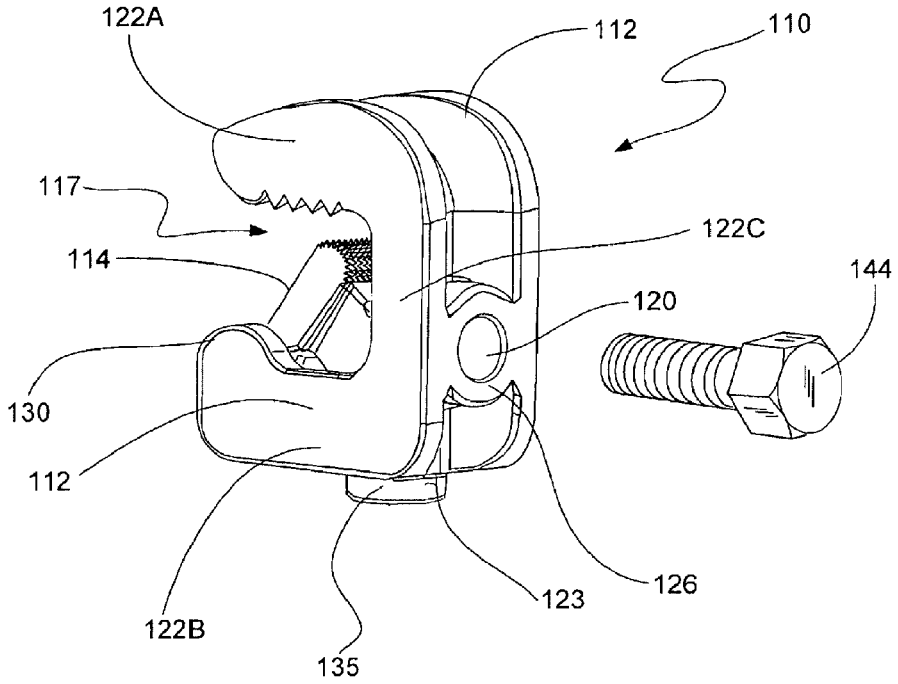
FIG. 7 is a perspective view of another embodiment of a clamp body according to the present invention.
Figure 8:
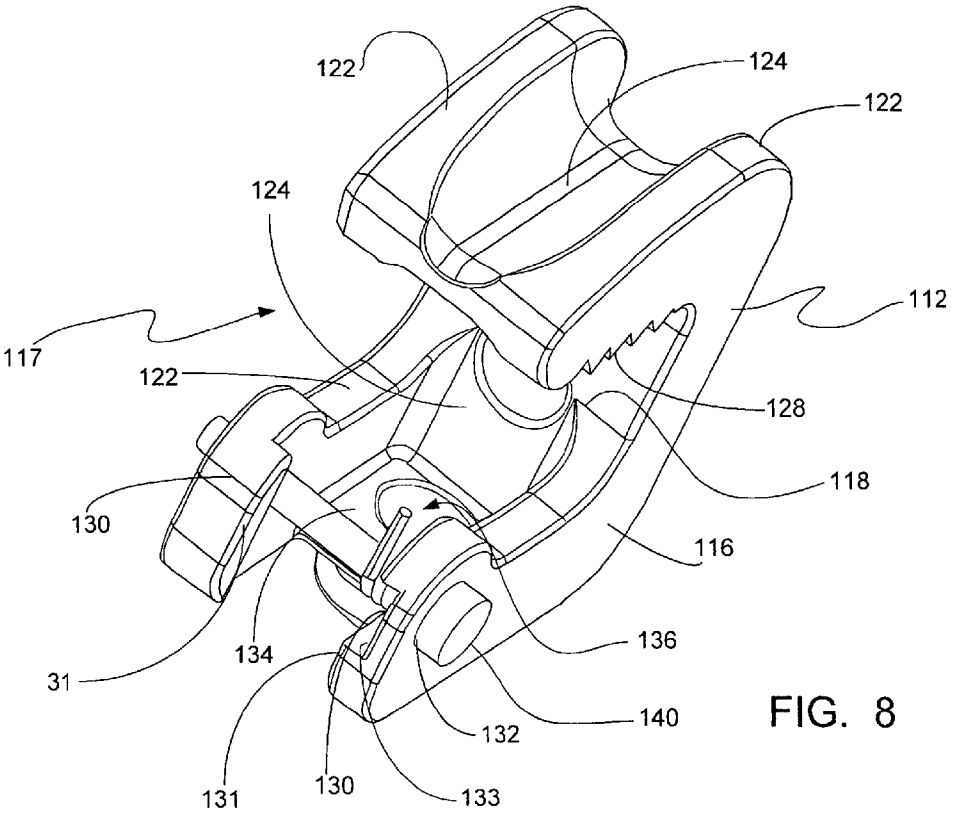
FIG. 8 is a perspective view of a clamp base of the clamp body of FIG. 7.

Referring to FIGS. 7-12, there is shown another embodiment of the clamping device according to the present invention. The clamping device of FIGS. 7-12 is similar to the clamping device of FIGS. 1-6. FIG. 7 shows clamp body 110 having a clamp base 112 and a rotational portion 114. The clamp base 112 has a U or C shaped geometry with an upper portion 112A, a lower portion 112B and a side portion 112C connecting the upper portion 112A and lower portion 112B by material continuity. The upper and lower portions 112A and B are wider then the side portion 112C. FIG. 8 shows the clamp body 110 including an exterior surface 116, an interior surface 118 and an interior cavity 117. The clamp base 112 is preferably a unitary solid structure formed from a metallic material. FIG. 8 shows clamp base 112 includes two C-shaped parallel outer plates 122 connected together by a recessed or concaved portion 124 extending between the plates 122. The concaved portion 124 extends from the upper portion 112A to the side portion 112C on the exterior surface 116 of the clamp base 112. The concaved portion 124 is interrupted by a raised cylindrical flange 126 which extends from the concaved portion 124 to meet the outer plates 122. The cylindrical flange 126 includes a threaded opening 120 therethrough for a threaded bolt 144 to extend through the clamp base 112 from the exterior surface 116 to the interior surface 118. The bolt 144 is threaded into the opening 120 and biases against the rotational portion 114 thereby pressing the rotational portion against the flange of a beam with greater force.

Figure 10:
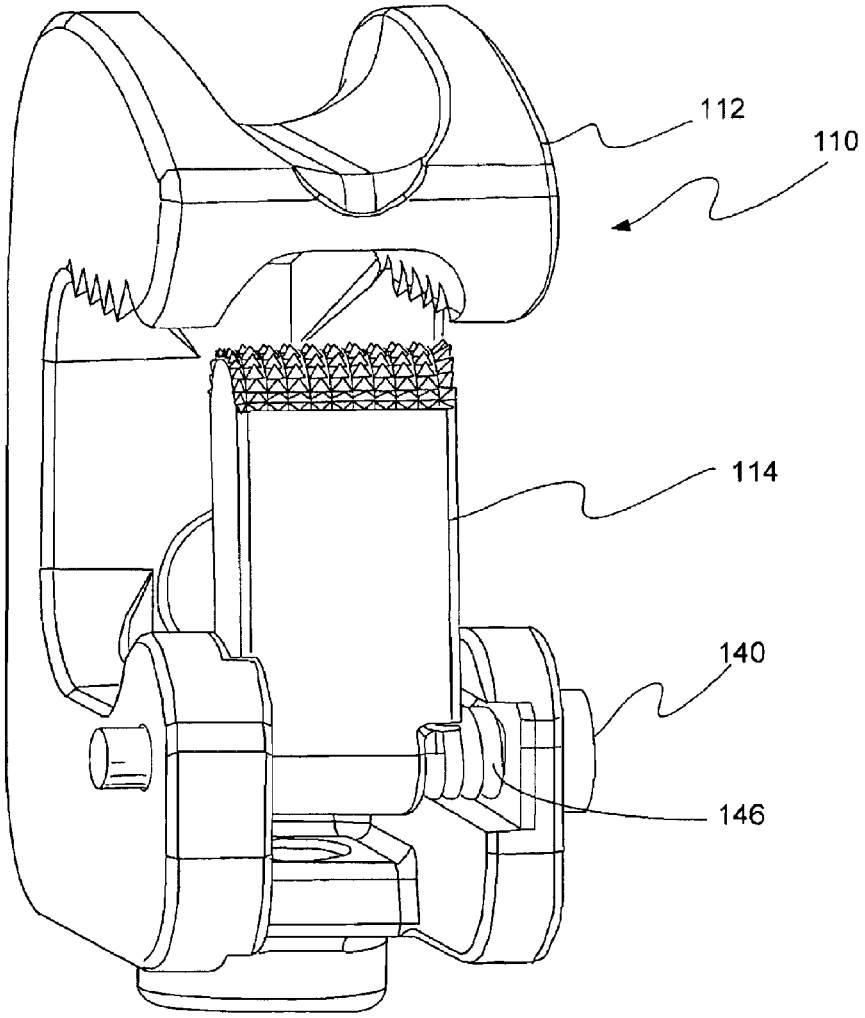
FIG. 10 is a front perspective view of the clamp of FIG. 7.

The interior surface 118 of the upper portion 112A includes a row of teeth 128 which contact and grip the beam flange placed therein during use. As shown in FIG. 10, teeth 128 are on each plate 122 but other configurations are possible. The interior surface 118 of the lower portion 112B of each plate 122 includes an upwardly protruding rounded tip 130. The tips 130 are the widest part of the plates 122 and extend from the lower portion 112B toward the upper portion 112A. Each tip 130 includes an opening 132 therethrough for a pin 140 to extend through each opening 132 and extend from one plate 122 to the other plate 122, as shown in FIG. 8. The tip 130 includes inwardly facing wedges or stops 131 which protrude from the outer edge of the tip 130 toward each plate 122. The stop 131 limits the placement of the rotational portion 114 within the interior cavity of the base. The stop 131 also positions the rotational portion against the flange of a beam. One of the stops 131 includes a channel 133 to allow for a spring 146 of a pin 140 to seat.

The lower portion 112B of the clamp base 112 also includes a threaded receiver base 134 for receiving a threaded rod therein. The threaded receiver base 134 can be round, hexagonal or rectangular and extends perpendicular to the plates 122. The threaded receiver base 134 is connected to the end of the concaved portion 124 by the lower portion 112B. The threaded receiver base 134 includes a hole 136 which extends from the exterior surface 116 through to the interior surface 118. Threads are disposed along at least a portion of the inner diameter of the hole 136 of the threaded receiver base 134. The threaded receiver base 134 includes a flange extension 135 which extends about the hole 136 on the exterior surface 116 of the lower portion 112B.

Figure 9:
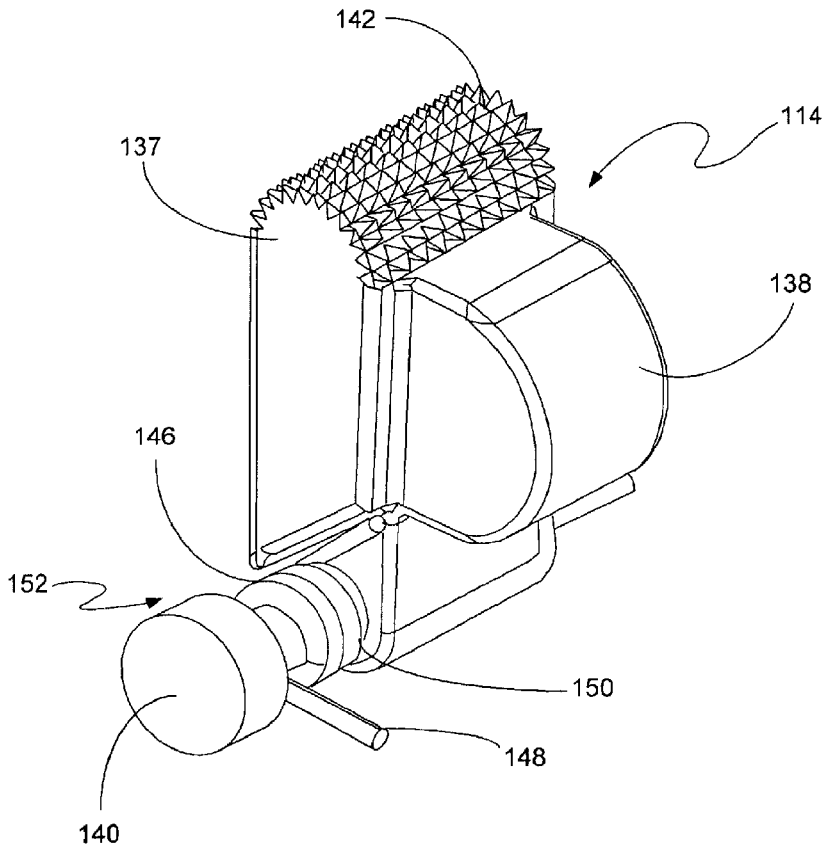
FIG. 9 is a perspective view of a rotational portion of the clamp body of FIG. 7.
Figure 11:
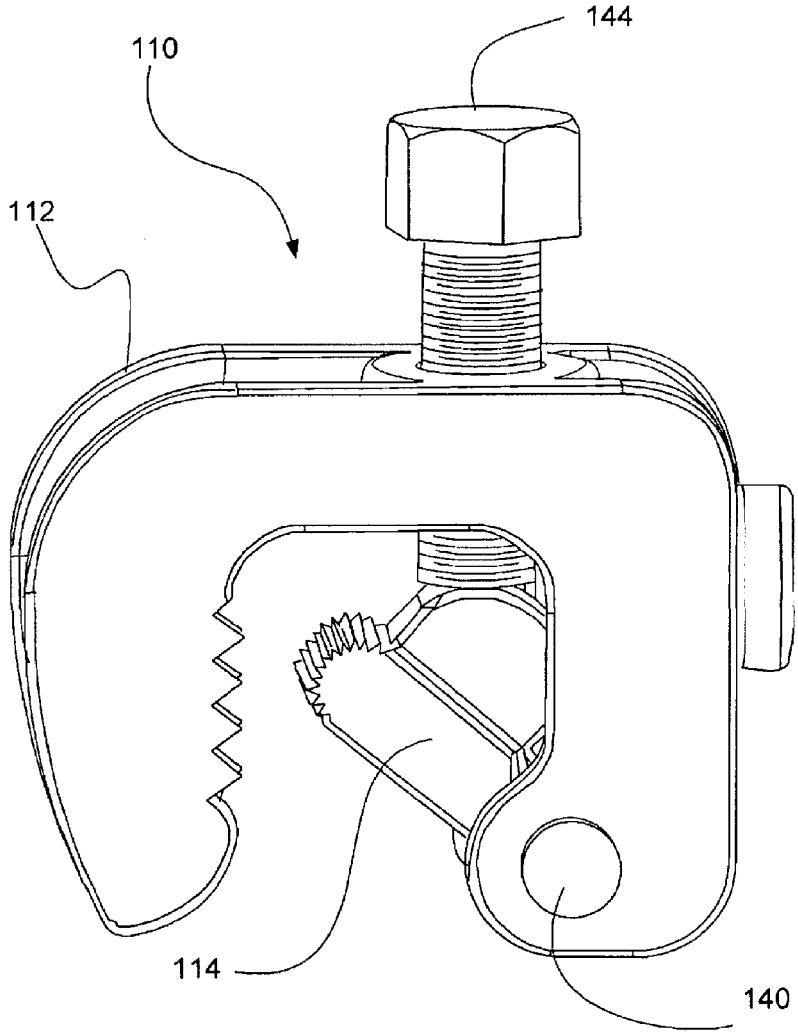
FIG. 11 is a side perspective view of the clamp of FIG. 10.

As shown in FIG. 7, the rotational portion 114 is removably attached within the clamp base 112 via pin 140. FIG. 9 shows the rotational portion 114 which has an oblong shape with rounded ends. One rounded end 137 includes a series of rows of teeth 142 for gripping and securing to a beam flange. The teeth 142 cover the rounded surface of the rounded end 137 to allow for some of teeth 142 to remain generally perpendicular with respect to the contacted surface of the flange for better securement thereto. The other rounded end includes a hole 150 therethrough for allowing pin 140 to facilitate attachment to the clamp base 112, as shown in FIGS. 8 and 10. One side of the rotational portion 114 includes a protruding arch portion 138. The arch portion 138 is generally shorter in length and shorter in width then the side of the rotational portion 114. The arch portion 138 engages with a bolt 144 to rotate the teeth 142 of the rotational portion 114 toward the teeth 128 of the upper portion 112A as shown in FIG. 11 to tighten the grip and attach the clamp device 110 to a beam flange. All these parts of the rotational portion 114 are connected by material continuity and preferably molded as a single piece.

The rotational portion 114 is attached to the clamp base 112 via mateable device 152, as shown in FIGS. 9-11. The mateable device includes pin 140, openings 132 and hole 150. The pin 140 extends through one opening 132 of the plate 122, through the hole 150 of the rotational portion 114, and through the other opening 132 of the plate.

Torsion spring 146 is coiled around pin 140 and sandwiched between the rotational portion 114 and a plate 122. The torsion spring includes an extension arm 148. The extension arm 148 seats in the channel 133 of the base 112 and the extension arm 148 comes into contact with the interior surface 118 of the base 112. The extension arm 148 pushes against stop 131 in channel 133 and limits or biases the movement of the rotational portion 114 away from the interior surface 118 of the clamp base 112. Thus, as the beam flange is introduced to the interior of the base 112, the torsion spring 146 provides resistance against the flange of the beam as it forces the rotational portion 114 to push upwardly against the beam flange and out from the interior cavity of the base 112. Thus, pulling the beam flange out from the clamp body 110 is hindered because as the flange is pulled out, the spring 146 pushes the rotational portion 114 outward against the flange. The teeth 142 dig into the flange further. Thus, the spring creates a one-way easy entry into the interior cavity of the clamp body 110, but prevents easy removal or slipping out of the beam flange. The resistance between the flange and the clamp body 110 provides for temporary securement of the clamp body 110 to the beam, without the need for additional screws to adjust the clamp body to fit the beam and secure it thereto.

Bolt 144 extends through opening 120 of the clamp base 112 to engage with the arch portion 138 of the rotational portion 114. As the bolt 144 is pushed against the arch portion 138, the rotational portion 114 is pushed upward toward teeth 128 of the clamp base 112. The space between the teeth 128 and teeth 142 is narrowed and the flange introduced between the teeth is secured therebetween.

A threaded rod (not shown) extends into the threader receiver 134 at the bottom of clamp body 110 and can be screwed into clamp body 110, as similarly discussed above with regards to the clamp body 10 of FIGS. 1-6. As the threaded rod is tightened upwardly, it pushes against the arch portion 138 which allows for teeth 142 of the rotational portion 114 to press against the beam permanently securing the clamp body 110 to the beam flange. The free end of the rod is available for attachment of various devices. Thus, the threaded rod serves two purposes, i.e. to permanently secure the clamp body 110 to the beam and to allow for attachment of various devices.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. A beam clamp comprising:

a body including a base, a rotational portion and a mateable device pivotably connecting said base to said rotational portion, said base having a C-shaped geometry, said C-shaped geometry defining an interior cavity, said base includes two parallel outer plates having said C-shaped geometry connected by a recessed portion, said base including a row of teeth *on an upper portion of said C-shaped geometry* extending into said interior cavity, [wherein said base includes a curling bracket therein,] said rotational portion extending into said interior cavity, said rotational portion *being mounted between the two parallel outer plates at a lower portion of said C-shaped geometry and* including a series of protruding teeth at one end, said series of protruding teeth extend into said interior cavity*; the body further including a threaded hole extending through said base to provide for attachment of a threaded rod, wherein said mateable device includes a pin extending through said base and said rotational portion, and wherein said pin includes a torsion spring thereabout to resist deflection of said rotational portion into said interior cavity of said base*.

[2. The beam clamp of claim 1, wherein said mateable device includes a pin extending through said base and said rotational portion.]

[3. The beam clamp of claim 2, wherein said pin includes a torsion spring thereabout to limit the movement of said rotational portion within said interior cavity of said base.]

4. The beam clamp of claim 1, [wherein said body] further [includes] *comprising* a [bolt] *threaded rod* extending through said *threaded hole in the* body and engaging with said rotational portion.

5. The beam clamp of claim 1, wherein said rotational portion includes a protruding arch portion perpendicularly extending into said interior cavity of said base.

[6. The beam clamp of claim 1, further including a threaded receiver extending through said base to provide for attachment of a threaded rod.]

7. The beam clamp of claim 1, wherein said *base includes a* curling bracket [includes] *having* sloped slots for accepting [a] *said* mateable [portion] *device* therein.

8. The beam clamp of claim 1, wherein said recessed portion extending perpendicularly between said plates.

[9. The clamp beam of claim 1, wherein said curling bracket includes a rounded end, each rounded end includes said opening therethrough for accepting said mateable device therein, said rounded end includes inwardly facing extension stop which extends into said interior cavity.]

10. A beam clamp comprising:

a body including a clamp base, a rotational portion and a mateable device pivotably attaching said clamp base to said rotational portion, said clamp base including two parallel C-shaped planar plates attached together by a recessed portion [and a threaded receiver portion] *provided on at least an upper portion of an interior cavity of the clamp base*, each plate including a row of teeth *on an upper portion thereof* and [an opening] *openings* through [one end] *a bottom portion* of each plate, [said recessed portion] *a bottom of said clamp base* includes [a hole therethrough for a bolt to extend therethough, said threaded receiver portion including] a threaded hole to accept a threaded rod therein;

said rotational portion includes a hole therethrough for accepting [a] *said* mateable device therein; and said mateable device extends through said openings [through] *in* said *bottom portion of each* plate [ends] and said hole through said rotational [end] *portion, the rotational portion being positioned between the two C-shaped plates, wherein said mateable device is a pin, and wherein said mateable device further includes a spring, said spring being coiled around said pin and said spring being sandwiched between one of said plates and said rotational portion.*

[11. The clamp beam of claim 10, wherein each plate includes a rounded end, each rounded end includes said opening therethrough for accepting said mateable device therein, said rounded end includes inwardly facing extension stop which extends into said interior cavity.]

[12. The beam clamp of claim 10, said mateable device is a pin.]

[13. The beam clamp of claim 12, said mateable device further includes a spring, said spring is coiled around said pin and said spring is sandwiched between one of said plates and said rotational portion.]

[14. The beam clamp of claim 13, said plates, said recessed portion and said threaded receiver portion define an interior cavity of said base, said rotational portion seats within said interior cavity of said base.]

15. The beam clamp of claim 10, *wherein* one end of said rotational portion includes a series of teeth extending outwardly from said end.

16. A beam clamp comprising:

a body including a base, a rotational portion, a mateable device, and a threaded receiver, said base includes an interior cavity and an external surface, said base and said rotational portion are pivotably connected by said mateable device, said rotational portion extends into said interior cavity, said rotational portion including a rounded surface with teeth covering said rounded surface, said rotational portion includes a torsion spring, said threaded receiver extends from said base, said base includes teeth extending toward the rotational portion, said rotational portion includes teeth extending toward the base, said mateable device includes a pair of pins and a pair of slots, said pins extend from said rotational portion and said pair of slots is integral with said base, said pair of pins being received by said pair of slots and pivotable therein; and a threaded rod attached to said body by mating with said threaded receiver.

17. The beam clamp of claim 16, wherein said rotational portion includes a rounded wedge portion having said rounded surface thereon and a triangular portion integrally extending from said rounded wedge portion.

18. The beam clamp of claim 17, wherein said triangular portion contacts said rod, said rod forcing said rotational portion out from said interior cavity of said base.

*19. The beam clamp of claim 1, wherein the C-shaped geometry is connected by the recessed portion provided on at least a portion of the interior cavity of the base.*

*20. The beam clamp of claim 19, wherein the recessed portion is provided on an upper portion of the base.*

*21. A beam clamp comprising:*

*a body including a base, a rotational member and a means for pivotably connecting said rotational member to said base, said base having a C-shaped geometry, said C-shaped geometry defining an interior cavity, said base includes two C-shaped parallel outer plates connected by a recessed portion, said base including a plurality of teeth on an upper portion of the C-shaped geometry of said base, said teeth and said rotational member extending into said interior cavity, said rotational member including a series of protruding teeth extending into said interior cavity, a bottom portion of said base including a threaded hole for receiving a threaded rod therein, wherein said means for pivotally connecting said rotational member to said base includes a pin extending through said parallel outer plates forming a lower portion of the C-shaped geometry of said base, the pin further including a torsion spring thereabout to resist deflection of said rotational member into said interior cavity of said base, the rotational member further including a portion which protrudes into the interior cavity of said base whereby upon rotation of the threaded rod, an upper end of the threaded rod contacts the rotational member protruding portion to press the rotational member teeth and base teeth against a beam inserted therebetween to secure the clamp to the beam.*

*22. The beam clamp of claim 21, wherein the plurality of teeth on the upper portion of the C-shaped geometry of said base are provided on said parallel outer plates to form two rows of teeth.*

*23. A beam clamp comprising:*

*a body including a base, a rotational portion and a mateable device pivotably connecting said base to said rotational portion, said base having a C-shaped geometry, said C-shaped geometry defining an interior cavity, said base includes two parallel outer plates having said C-shaped geometry connected by a recessed portion, said base including a row of teeth on an upper portion of each of said two parallel outer plates having said C-shaped geometry extending into said interior cavity, said rotational portion extending into said interior cavity, said rotational portion being mounted between the two parallel outer plates at a lower portion of said C-shaped geometry and including a series of protruding teeth at an upper portion thereof, said series of protruding teeth extending into said interior cavity, wherein said mateable device includes a pin extending through said base and said rotational portion, and further wherein*

*said pin includes a torsion spring thereabout to resist deflection of said rotational portion into said interior cavity of said base.*

* * * * *